J. L. KRAUSER.
Car Wheels.

No. 152,125. Patented June 16, 1874.

Witnesses.
John Becker
Fred Haynes

J. L. Krauser
by his Attorneys
Brown & Allen

UNITED STATES PATENT OFFICE.

JOHN L. KRAUSER, OF TYLERSBURG, PENNSYLVANIA.

IMPROVEMENT IN CAR-WHEELS.

Specification forming part of Letters Patent No. 152,125, dated June 16, 1874; application filed September 23, 1873.

*To all whom it may concern:*

Be it known that I, JOHN L. KRAUSER, of Tylersburg, in the county of Clarion and State of Pennsylvania, have invented an Improvement in Car-Wheels, of which the following is a specification:

This invention has for its object to produce a light and strong wheel for railroad-cars, which may be easily and cheaply manufactured.

My invention consists in making the spokes of the wheel of hollow metal cylinders, and in casting the hub and tread to the ends of the spokes. The tubes composing the latter are compressed to taper from the hub toward the tread, so that the cross-section near the hub will be an ellipse. The great advantage of this shape of spoke is that larger pipes may be used, which, by being compressed near the hub, will not interfere with each other.

An additional advantage of this construction of the spokes is that they will be more firmly connected to the hub than if they were to retain the cylindrical form throughout.

Figure 1:
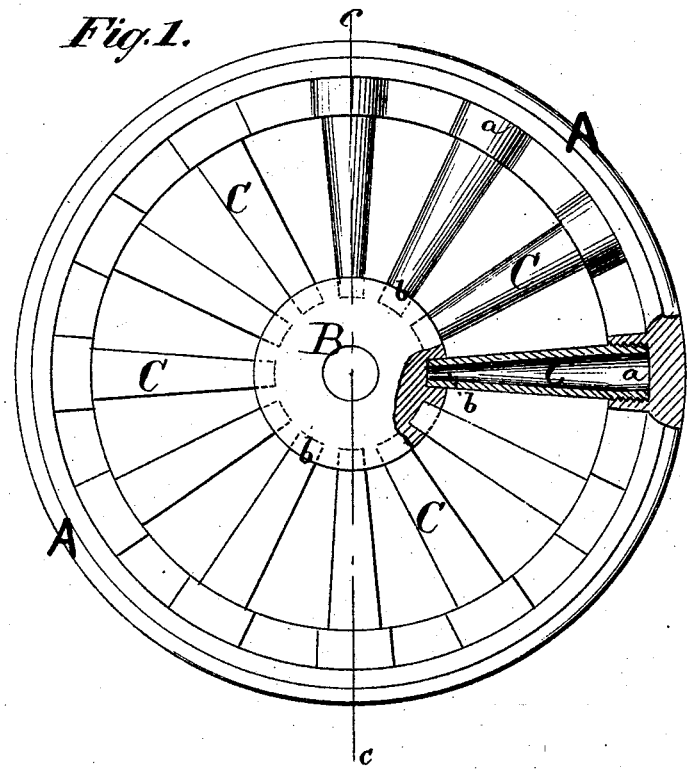
Figure 2:
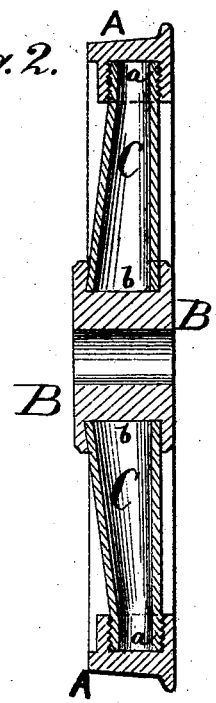

In the accompanying drawing, Figure 1 is a face view, partly in section, of a car-wheel of my improved construction. Fig. 2 is a transverse section thereof on the line *c c*, Fig. 1.

Similar letters of reference indicate corresponding parts in both figures.

The letter A represents the tread or tire of the wheel. B is the hub. The spokes C C are made of hollow cylinders, preferably of gas-pipe, the diameter of which should be but little less than the width of the tread or tire. These spokes are compressed at their inner ends, so as to taper from the hub toward the tread, as in Fig. 2, the cross-section being therefore at the hub in form of an ellipse or oval, and at the tread a circle. On the face of the wheel the spokes thus compressed appear smaller at their inner than at their outer ends, as in Fig. 1, the spokes being so set in the hub that the major diameters of their ellipses or ovals will be parallel to the axis of the wheel.

It is evident that a section of each spoke C parallel to the axis of the wheel will show a truncated cone, Fig. 2, while a section at right angles to the axis will show an inverted truncated cone, Fig. 1.

At the outer ends *a* of each spoke C a screw-thread is cut upon it, or it is otherwise roughened to be the more firmly connected to the tread.

In the manufacture of the wheel the spokes C are, after being shaped in the manner described, placed in the mold in which the wheel is to be cast, and the hub and tread are then cast on them. The inner ends *b b* of the spokes will, by virtue of their conical form, be firmly held in the hub, while the tread A, covering the roughened outer ends *a a* of the spokes, will thereby also be tightly attached to them.

The tire is preferably made of cast-steel, and in the process of casting the pipes are suitably plugged at or near their ends to prevent the cast metal from flowing in. Pipes may be employed of which the diameter is greater than the width of the tread or tire, and in this case their ends may be flattened in suitable direction.

I claim as my invention and desire to secure by Letters Patent—

The car-wheel, having the tread A and hub B made of cast metal, and the spokes C made of tubes flattened at their inner ends to form ellipses, with their major axes parallel with the axis of the wheel, substantially as and for the purpose shown and set forth.

JOHN L. KRAUSER.

Witnesses:
CYRUS KRAUSER,
J. J. LIVINGSTON.